(12) United States Patent
Buehl

(10) Patent No.: US 8,938,622 B2
(45) Date of Patent: Jan. 20, 2015

(54) ENCRYPTION IN THE CLOUD WITH CUSTOMER CONTROLLED KEYS

(71) Applicant: Matthias Buehl, Heidelberg (DE)

(72) Inventor: Matthias Buehl, Heidelberg (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/624,069

(22) Filed: Sep. 21, 2012

(65) Prior Publication Data

US 2014/0089674 A1   Mar. 27, 2014

(51) Int. Cl.
*G06F 11/30* (2006.01)
*H04L 29/06* (2006.01)
*G06F 21/62* (2013.01)
*G06F 12/14* (2006.01)
*G06F 21/70* (2013.01)

(52) U.S. Cl.
CPC .............. *H04L 63/062* (2013.01); *G06F 21/62* (2013.01); *G06F 12/14* (2013.01); *G06F 21/70* (2013.01)
USPC ........................................ 713/189; 380/277

(58) Field of Classification Search
CPC ......... G06F 12/14; G06F 21/70; G06F 21/10; G06F 21/62; H04L 63/062

USPC ........ 713/171, 189, 193; 380/277, 281; 726/2
See application file for complete search history.

(56) References Cited

U.S. PATENT DOCUMENTS

| | | | |
|---|---|---|---|
| 2010/0115606 A1* | 5/2010 | Samovskiy et al. | 726/15 |
| 2011/0167221 A1* | 7/2011 | Pangal et al. | 711/117 |
| 2012/0072728 A1* | 3/2012 | Teather et al. | 713/171 |
| 2012/0311317 A1* | 12/2012 | Elrod et al. | 713/150 |
| 2013/0097417 A1* | 4/2013 | Lauter et al. | 713/150 |
| 2013/0219169 A1* | 8/2013 | Del Signore et al. | 713/153 |

* cited by examiner

*Primary Examiner* — Samson Lemma
(74) *Attorney, Agent, or Firm* — Mintz Levin Cohn Ferris Glovsky and Popeo, P.C.

(57) ABSTRACT

A system and method for encryption in a cloud computing platform with customer controlled keys is disclosed. A cloud-based encryption key is uploaded from a customer computing platform to a key store of the cloud computing platform, based on a customer-based encryption key. The cloud-based encryption key and customer-based encryption key is able to encrypt or decrypt customer data used by an application server running on the cloud computing platform. Next, the cloud-based encryption key is unlocked from the key store, and then stored in a secure store of a main memory associated with the customer computing platform. Then, according to encryption or decryption mechanism, the unlocked cloud-based encryption key is accessed to encrypt or decrypt customer data stored on a database of the main memory and used by the application server.

9 Claims, 2 Drawing Sheets

ENCRYPTION IN THE CLOUD WITH CUSTOMER CONTROLLED KEYS

TECHNICAL FIELD

The subject matter described herein relates to data encryption and security, and more particularly, to encryption in the "cloud" with customer controlled keys.

BACKGROUND

Cloud computing refers to a network platform and software architecture for providing centralized, shared computing and storage resources as services to a community of customers. A major issue facing a cloud service provider and its customers is data security. One way of securing each separate customer's data is by encryption. Presently, either the cloud service provider performs the encryption on its shared database and maintains the keys, or the data is already uploaded encrypted by the customer, but an associated cloud application is not able to decrypt the data.

If database encryption shall be used, no matter whether it is in the cloud or on premise, the database interface of the application software running on this database needs the keys to decrypt the database, otherwise the encryption cannot work. Further, in the case where not the entire database but only certain fields of some tables are not to be encrypted, such as credit card numbers or social insurance numbers, the application software on the server in the cloud will need the keys.

It is not presently possible to have the decryption performed on the client side in the customer landscape. Application functions such as "Search", "Sort" etc. will not work if the application software does not have the keys to decrypt application data. Further, database administrators of the cloud service provider are not able to access the decryption keys, as they are completely under the control of the customer.

SUMMARY

The goal of this invention is to help customers of cloud services, especially of "Software as a Service" (Saas) offerings, to keep their data in the cloud secure, and to comply with data privacy regulations. The customer is given full control over the encryption of the data by being given the encryption keys, but at the same time having the advantage of storing the encryption keys in the cloud. This is necessary for performance and functional reasons whenever the keys are used for encryption or decryption.

In one aspect, a method for encryption in a cloud computing platform with customer controlled keys is described. The method includes uploading, from a customer computing platform to a key store of the cloud computing platform, a cloud-based encryption key based on a customer-based encryption key. The cloud-based encryption key and customer-based encryption key are able to encrypt or decrypt customer data used by an application server running on the cloud computing platform. The method further includes unlocking, using a key unlocking mechanism, the cloud-based encryption key from the key store, and storing the unlocked cloud-based encryption key in a secure store of a main memory associated with the customer computing platform. The method further includes accessing, according to an encryption or decryption mechanism, the unlocked cloud-based encryption key to encrypt or decrypt customer data stored on a database of the main memory and used by the application server.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
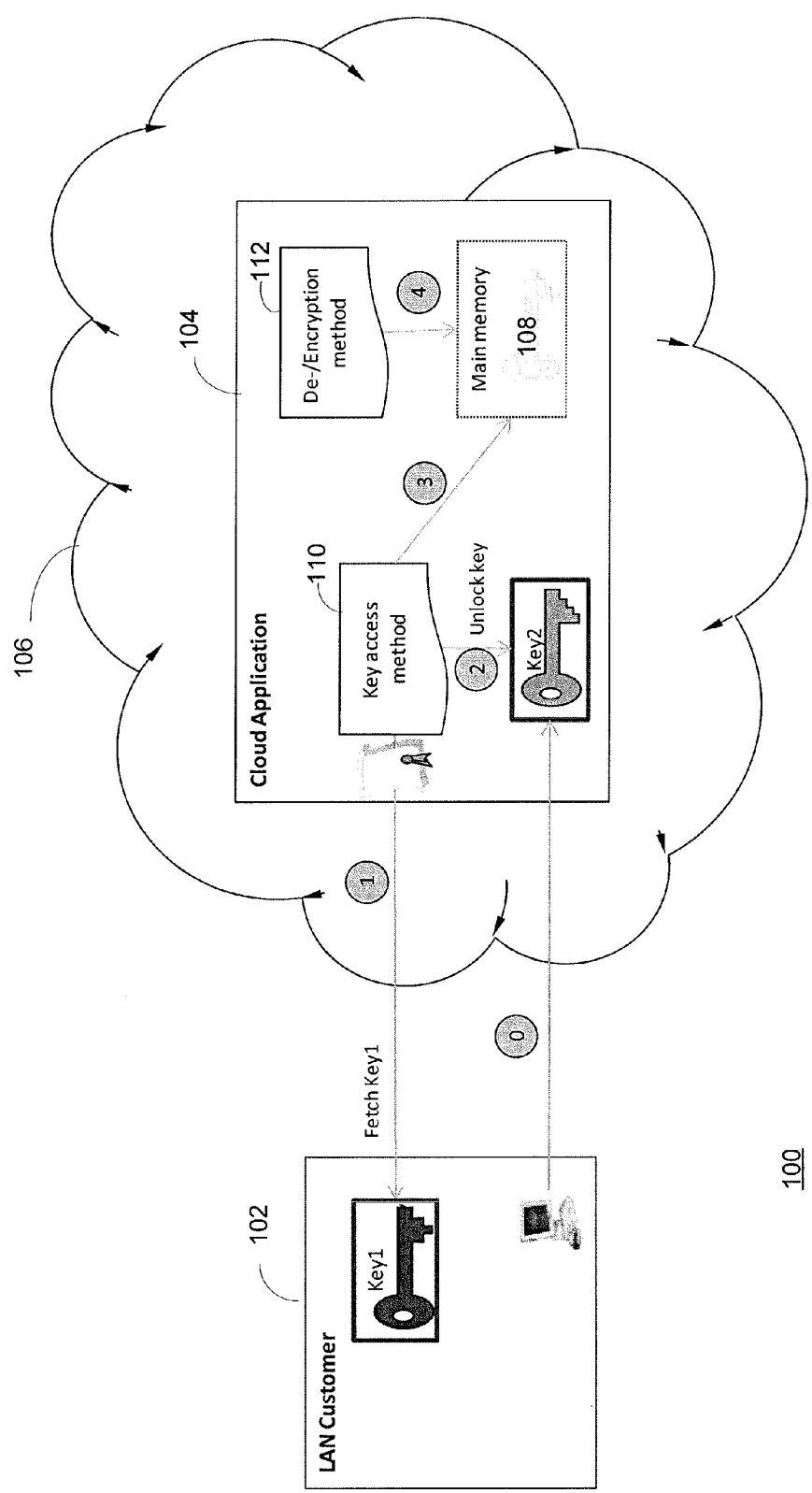
FIG. 1 is a system diagram of a cloud computing platform that interacts with a customer computing platform that controls encryption keys.

To address these and potentially other issues with currently available solutions, methods, systems, articles of manufacture, and the like consistent with one or more implementations of the current subject matter can, among other possible advantages, provide This document describes a system and method for encryption in the cloud with customer controlled keys. FIG. 1 illustrates a system 100 in which one or more customer computing systems 102 are provided cloud-based application services by a cloud computing platform 106. The cloud computing platform 106 includes a cloud application 104 that uses a main memory 108. The system 100 provides a secure store within the main memory 108 on the cloud application 104, which only the customer is allowed to open with their own personal keys, denoted in FIG. 1 as "Key1".

The key that is used for the encryption of data on the database of the main memory 108 is also stored within the secure store, and is denoted as "Key2", which is uploaded by the customer once during the setup phase of the cloud application 104, and will also be only known to the customer. Any type of key and/or type of encryption algorithm can be used. The cloud-based key "Key2" is locked, and can be unlocked, using the locally stored and controlled customer key "Key1."

"Key1" can be easily exchanged/renewed, as this key exchange or renewal does not require re-encryption of the entire database of the main memory 108, but only the information in the secure store in the cloud computing platform 106. Thus, the customer can hide "Key2" for the encryption of its data in his own secure store in the cloud computing platform, and the cloud service provider will not be able to access it.

Whenever the cloud application 104 is started, "Key2" is unlocked by the customer's "Key1" and then stored in the main memory 108 of the cloud application 104, where it can be continuously accessed by either an encryption or decryption method, but not by a cloud administrator.

The encryption and decryption methods require access the "Key2" in main memory 108, which access can be provided by one of several code-based authorizations. "Key2" is never physically stored outside the secure store in the database of main memory 108, such as in the file system or in some log file of the cloud application 104. An unlocking mechanism of a key access method 110 allows the cloud application 104 to use "Key2" for encryption/decryption of certain data stored in main memory 108.

Figure 2:
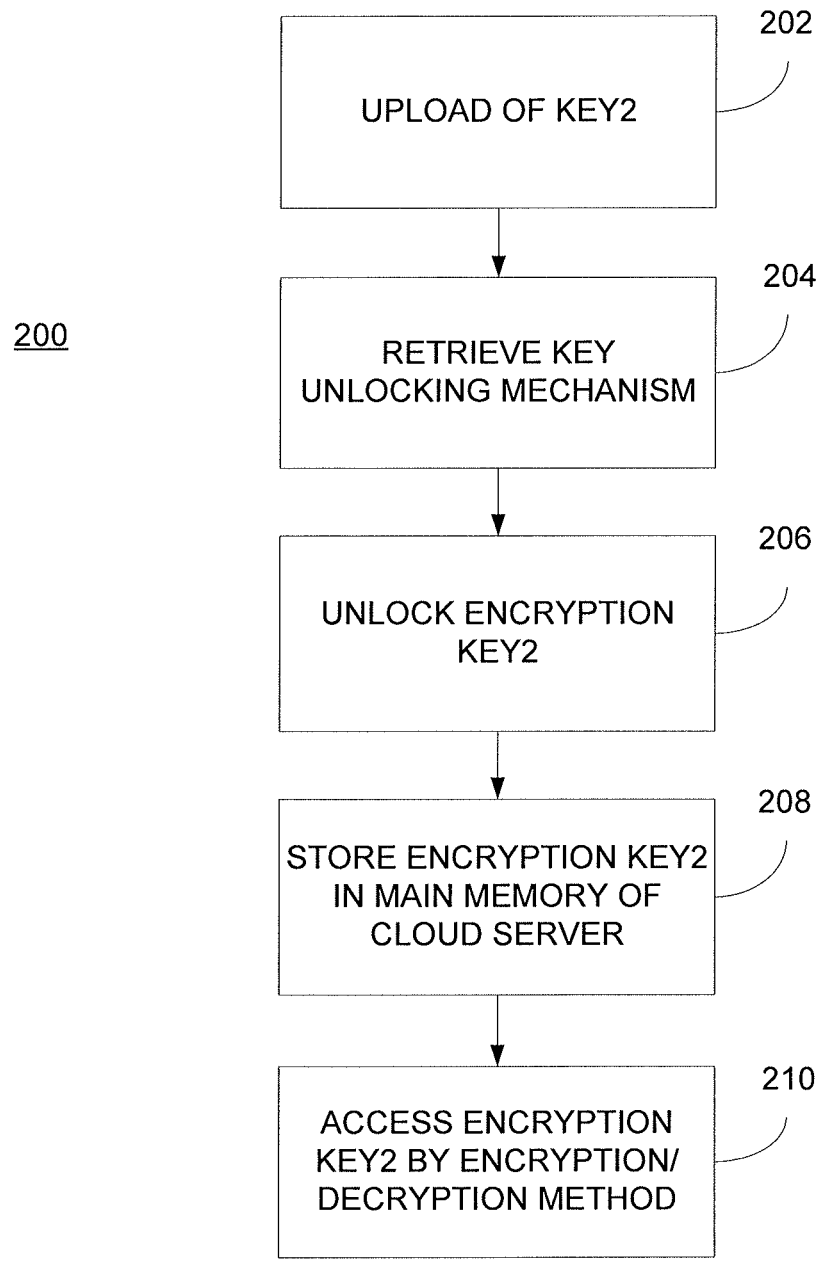
FIG. 2 is a flowchart of a method of encryption in the cloud with customer controlled keys.

FIG. 2 is a flowchart of a method 200 of encryption in the cloud with customer controlled keys. At 202, an encryption key "Key2," is uploaded into a key store of an application server of a cloud computing platform, from a customer computing system communicating with the cloud computing platform via a network. "Key2" is based on a personal encryption key, "Key1" stored at the customer computing system. At 204, "Key2" is retrieved by a key access method executed by a processor on the cloud computing platform and using the customer's key "Key1 ." At 206, the retrieved "Key2" is unlocked, and at 208 "Key2" is stored in a main memory of the cloud application server. At 210, to perform encryption or decryption on data in a database associated with the main memory, "Key2" is accessed from a secure store in the main memory according to any of a number of encryption/decryption methods executed by a processor. Accordingly, the customer always controls their encryption keys, whether or not a key is stored on the cloud.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT), a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for encryption in a cloud computing platform with customer controlled keys, the method comprising:

uploading, from a customer computing platform to a key store of the cloud computing platform, a cloud-based encryption key based on a customer-based encryption key, the cloud-based encryption key and customer-based encryption key being able to encrypt or decrypt customer data used by an application server running on the cloud computing platform;

retrieving the customer-based encryption key stored on the customer computing platform;

unlocking, by one or more processors executing a key unlocking mechanism using the customer-based encryption key, the cloud-based encryption key from the key store;

storing, by one or more processors, the unlocked cloud-based encryption key in a secure store of a main memory associated with the customer computing platform; and accessing, by one or more processors executing an encryption or decryption mechanism, the unlocked cloud-based encryption key to encrypt or decrypt customer data stored on a database of the main memory and used by the application server.

2. The method in accordance with claim 1, wherein the unlocking the cloud-based encryption key further includes:

unlocking the cloud-based encryption key from the key store using the customer-based encryption key.

3. The method in accordance with claim 1, wherein the accessing the unlocked cloud-based encryption key to encrypt or decrypt customer data further includes:

determining a relationship of the customer data with the cloud-based encryption key.

4. The method in accordance with claim 3, wherein the accessing the unlocked cloud-based encryption key to encrypt or decrypt customer data further includes:

accessing the unlocked cloud-based encryption key according to the relationship.

5. A computer program product comprising a non-transitory machine-readable medium storing instructions that, when executed by at least one programmable processor, cause the at least one programmable processor to perform operations comprising:

uploading, from a customer computing platform to a key store of the cloud computing platform, a cloud-based encryption key based on a customer-based encryption key, the cloud-based encryption key and customer-based encryption key being able to encrypt or decrypt customer data used by an application server running on the cloud computing platform;

retrieving the customer-based encryption key stored on the customer computer platform;

unlocking, according to a key unlocking mechanism using the customer-based encryption key, the cloud-based encryption key from the key store;

storing the unlocked cloud-based encryption key in a secure store of a main memory associated with the customer computing platform; and accessing, according to an encryption or decryption mechanism, the unlocked cloud-based encryption key to encrypt or decrypt customer data stored on a database of the main memory and used by the application server.

6. A system comprising:

at least one programmable processor; and a machine-readable medium storing instructions that, when executed by the at least one processor, cause the at least one programmable processor to perform operations comprising:

uploading, from a customer computing platform to a key store of the cloud computing platform, a cloud-based encryption key based on a customer-based encryption key, the cloud-based encryption key and customer-based encryption key being able to encrypt or decrypt customer data used by an application server running on the cloud computing platform;

retrieving the customer-based encryption key stored on the customer computing platform;

unlocking, according to a key unlocking mechanism using the customer-based encryption key, the cloud-based encryption key from the key store;

storing the unlocked cloud-based encryption key in a secure store of a main memory associated with the customer computing platform; and accessing, according to an encryption or decryption mechanism, the unlocked cloud-based encryption key to encrypt or decrypt customer data stored on a database of the main memory and used by the application server.

7. The system in accordance with claim 6, wherein the unlocking the cloud-based encryption key further includes:

unlocking the cloud-based encryption key from the key store using the customer-based encryption key.

8. The system in accordance with claim 6, wherein the accessing the unlocked cloud-based encryption key to encrypt or decrypt customer data further includes:

determining a relationship of the customer data with the cloud-based encryption key.

9. The system in accordance with claim 8, wherein the accessing the unlocked cloud-based encryption key to encrypt or decrypt customer data further includes:

accessing the unlocked cloud-based encryption key according to the relationship.

* * * * *